US006256493B1

(12) United States Patent
Dorenbosch et al.

(10) Patent No.: US 6,256,493 B1
(45) Date of Patent: Jul. 3, 2001

(54) SELECTIVE CALL RECEIVER AND METHOD FOR PROGRAMMING A SELECTIVE CALL RECEIVER

(75) Inventors: Jheroen Pieter Dorenbosch, Paradise; Mahmoud Charkhkar, Bedford; Terence Edward Sumner, Azle, all of TX (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/127,062

(22) Filed: Jul. 31, 1998

(51) Int. Cl.$^7$ ............................................. H04M 3/00
(52) U.S. Cl. ................... 455/419; 455/31.2; 455/32.1; 455/411; 455/418; 340/825.44; 340/825.22; 340/825.52
(58) Field of Search ................................ 455/31.2, 418, 455/419, 410, 411, 31.3, 32.1; 340/825.44, 825.52, 825.22

(56) References Cited

U.S. PATENT DOCUMENTS

| | | | |
|---|---|---|---|
| 5,878,339 | * | 3/1999 | Zicker et al. .......................... 455/419 |
| 5,959,546 | * | 9/1999 | Dorenbosch ...................... 340/825.44 |
| 5,983,074 | * | 11/1999 | Jansen .................................. 455/31.3 |
| 5,995,829 | * | 11/1999 | Broderick ............................ 455/418 |
| 6,029,065 | * | 2/2000 | Shah ..................................... 455/414 |
| 6,044,265 | * | 3/2000 | Roach, Jr. ............................ 455/419 |
| 6,052,581 | * | 4/2000 | O'Connell et al. .................. 455/419 |
| 6,088,457 | * | 7/2000 | Parkinson et al. .................... 380/270 |

* cited by examiner

*Primary Examiner*—Dwayne Bost
*Assistant Examiner*—Tamica M. Davis
(74) *Attorney, Agent, or Firm*—R. Louis Breeden

(57) ABSTRACT

The generic activation method of a selective call receiver apparatus (122) operating within a messaging system (100) includes providing a selective call receiver (122) having a group address (251) and a unique receiver identification (242) stored in a memory (218). The selective call receiver (122) receives a message addressed to the group address (251) containing the unique receiver identification (242) and programming information (249), and upon receiving the group address (251) and unique receiver identification (242), the method applies the programming information (249) to program the selective call receiver (122).

14 Claims, 4 Drawing Sheets

SELECTIVE CALL RECEIVER AND METHOD FOR PROGRAMMING A SELECTIVE CALL RECEIVER

FIELD OF THE INVENTION

This invention relates generally to communication systems and more specifically to an apparatus and corresponding method of programming selective call receivers.

BACKGROUND OF THE INVENTION

Messaging systems, such as paging systems, typically are capable of activation by a service provider or authorized agent in conjunction with an end user. Upon delivery to a subscriber, the selective call receiver is programmed with a customized profile based upon a unique identification assigned during the manufacturing process. This requires the selective call receiver to be physically collocated, albeit temporarily, with a means to facilitate activation by the service provider or duly authorized agent.

In order for the messaging system to confirm activation for a recently acquired selective call receiver, a test message is compiled, addressed and transmitted to the selective call receiver. The end-user must sense via the audio, visual, or tactile alert means the confirmation of service activation or contact the appropriate parties to re-attempt activation. This method of activation is relatively efficient for smaller localized messaging system enterprises.

Supplying more expansive messaging systems with a larger capacity of potential subscribers generally requires pre-programming certain key parameters prior to activation based upon projected demands in the geographic region. These key parameters are supplied and pre-programmed during the manufacturing process. These pre-programmed items may include service provider data, operational frequencies, pre-determined fee services, etc. During periods when selective call receivers are not being activated in "just in time inventory" fashion, investors, service providers and other interested parties must expend additional resources to re-program the preprogrammed manufacturer settings when current inventory does not match current demand constraints. These factors lead to a scenario of less than efficient capital expenditures for a selective call receiver prior to revenue being realized after activation.

With regard to customized information services in a paging environment, the service providers (paging and customized information services) utilize Over-The-Air-Programming (OTAP) addressed to an individual address that uniquely identifies the selective call receiver. The paging service provider and the customized information services provider are not necessarily the same entity. The individual address is necessary to enable as well as disable customized information services at a particular selective call receiver. Currently the customized information services provider shares appropriate control information with the paging service provider. The paging service provider's infrastructure generates a message addressed to the capcode of the selective call receiver. The message also contains control capabilities to activate, deactivate, or modify specific customized information services features. The customized information services are modified responsive to the message. Since the customized information services provider does not have direct access to this capcode or individual address assigned to the selective call receiver, the customized information services cannot be activated, deactivated, or modified independent of a paging service provider.

As the demand for customized information services provided by service providers increases, the need for controlling access, as well as, tracking the revenue stream created by this business is critical. Since the overhead required for the addition of innovative applications or post-activation modification of these information services requires efforts similar to the original activation of the selective call receiver, flexibility for both the customer and the service provider based on customer dynamics is desirable.

DETAILED DESCRIPTION OF A PREFERRED EMBODIMENT

Figure 1:
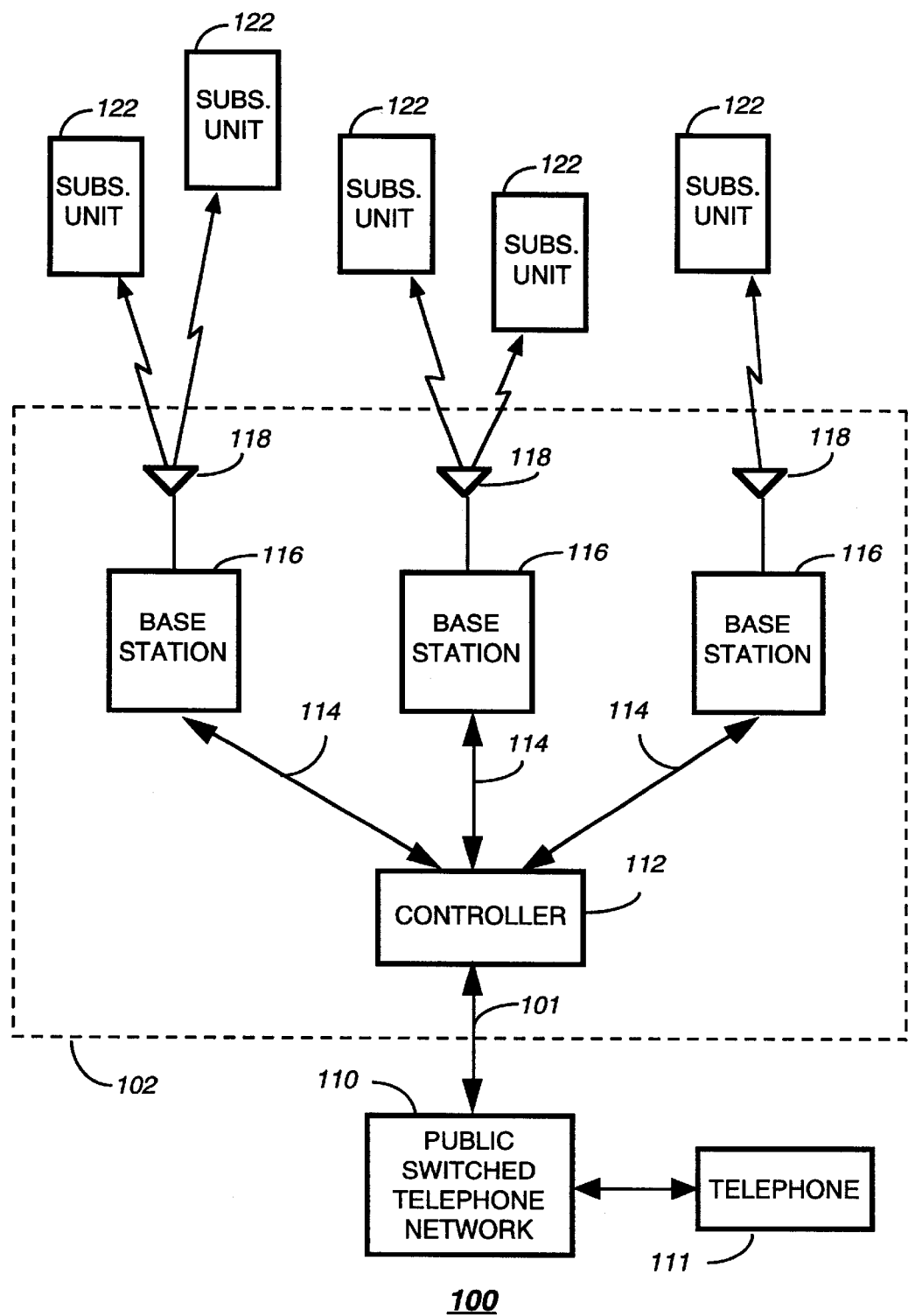
FIG. 1 is a block diagram of a messaging system in accordance with the instant invention.

Referring now by characters of reference to the drawings and first to FIG. 1, it will be understood that a radio communication system 100 such as is illustrated, represents a typical system configuration. A link 101 is utilized to couple the system infrastructure 102 to a public switched telephone network 110 which in turn is coupled to individual telephones such as telephone 111. The system infrastructure 102 typically includes a controller 112 which is linked by conventional transmission paths 114 to, in this case, a plurality of base stations 116 each having an antenna 118. In the preferred embodiment of the present invention, the system 100 can be a one-way or two-way communication system. In a one-way system the base stations 116 comprise transmitters only while in a two-way system receivers are also included for receiving incoming messages. A plurality of individual subscriber units 122 are provided. The subscriber units are preferably selective call receivers which can be one-way or two-way radio communication units.

Figure 2:
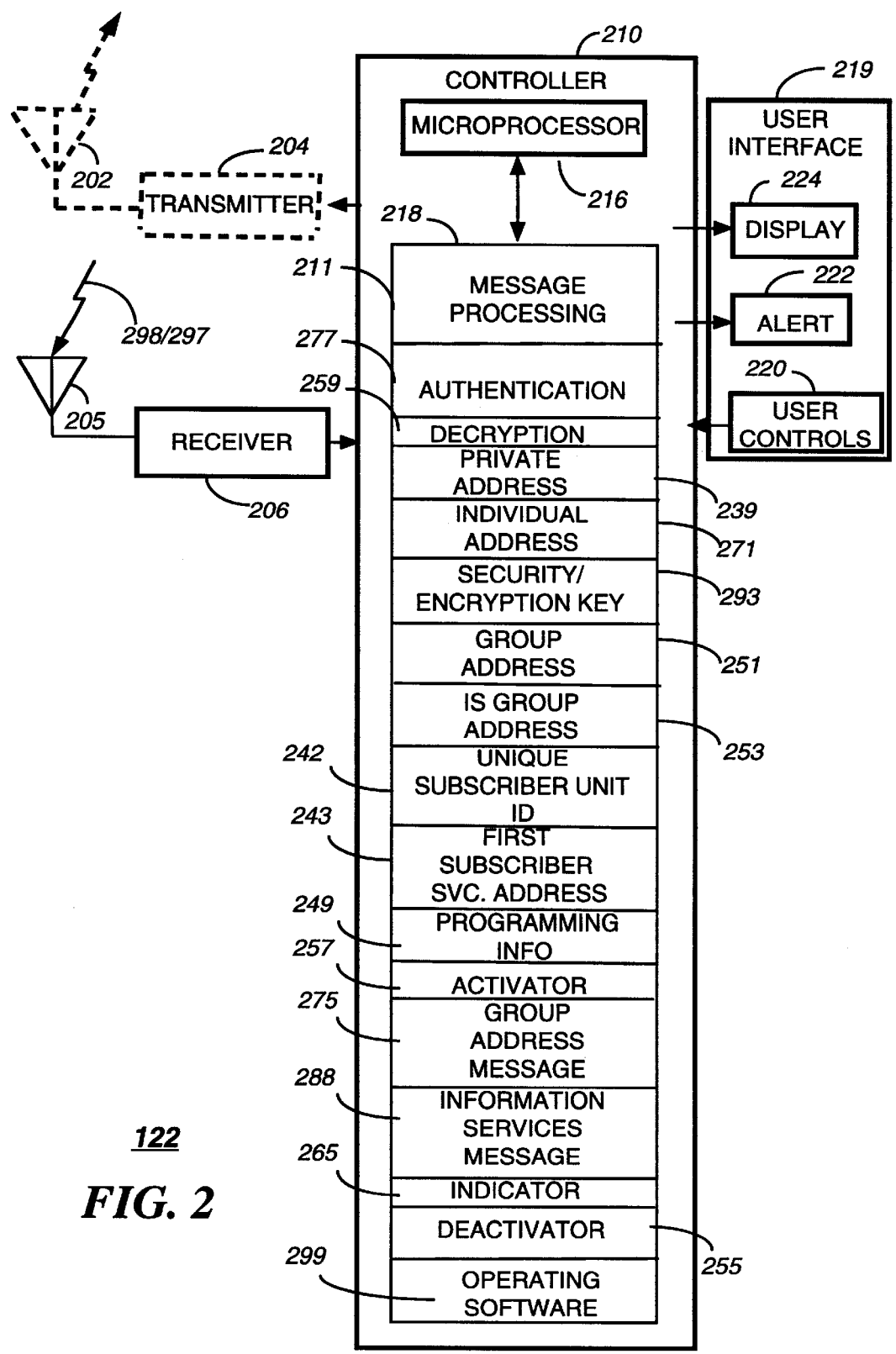
FIG. 2 is a block diagram of a subscriber unit in accordance with the instant invention.

Radio communication units 122 are illustrated in further detail in FIG. 2. As is conventional, radio communication units 122 include a receiver 206 coupled to an antenna 205 for receiving incoming messages. Where a two-way unit is to be provided, a transmitter 204 is optionally included and is coupled either to an optional transmit antenna 202 or if preferred can utilize the receiving antenna 205 for transmission purposes. The receiver 206 as well as the optional transmitter 204 are coupled in a conventional manner to a controller 210 which is in turn coupled to the user interface 219. The user interface 219 may include conventional interface portions such as a display 224, an alert 222, and user controls 220. The controller 210 typically includes a microprocessor 216 and a memory 218 which is partitioned to include both the operating software 299 as well as stored data such as address and other identifying information for the radio 122.

In the preferred embodiment, the memory 218 of the subscriber unit 122 is pre-programmed with a group address 251 and is capable of storing a private address 239. As is well known, private addresses 239 are used for purposes of transmitting messages that are to be received and decoded by a specific subscriber unit 122 while group addresses 251 are used for messages that are to be received and decoded by a group of subscriber units 122. The memory 218 of a selective call receiver 122 includes a unique subscriber unit identification or receiver ID 242 which can be, for instance, a serial number or other information that uniquely identifies a subscriber unit 122.

In conventional subscriber units 122, it is necessary to program a unit with the private address 239 prior to placing the unit in the field. This requires that such information be either programmed prior to distribution to the point of sale of the unit or at the time of the sale. This places a significant limitation on how such units are distributed since various regions or service areas require different programming information. Similarly, for group addresses 251, as for example an information service group address 253, it may be necessary to program the information service (IS) group address 253 with information regarding which of the services provided under that information service group address 253 are enabled in the particular subscriber unit 122. While existing radios 122 can program such information via commands received at the private address 239 of the unit, this approach necessitates routing such commands through the private address 239 which must then be known by the provider of the information service or else communicated via the operator or other entity who has access to the private address 271. In the preferred embodiment of the invention, one or more group addresses 251 can be utilized for providing programming information 249 to the subscriber unit 122. In the prior art, commands transmitted to a group address 251 inherently results in execution of the commands at all of the subscriber units 122 which are enabled to receive that group address 251 information.

In one embodiment of the present invention, the subscriber unit 122 is provided programming information 249 via messages addressed to a group address 251, and the messages are handled by message processing 211. In addition to the group address 251, the message includes the subscriber unit unique ID 242 as well as programming information 249. When such a message is received by the controller 210, the received group address is correlated to the group address 251 of the unit 122, and the receiver identification, handled by the message processing 211, is compared to the subscriber unit's unique ID 242. If they match, the programming information 249 included in the message is utilized by the microprocessor 216 to perform the appropriate programming of the memory 218. Such programming can be programming of the private address 239 of the subscriber unit 122. This permits the sale of generic or plain subscriber units 122 programmed with a group address 251 and subsequent programming of the private address 239 over the air. The identification information, unique to the selective call receiver 122, preferably serves as a filter to implement radio 122 activation utilizing well known Over-The-Air-Programming (OTAP) techniques. An activator 257, in conjunction with the microprocessor 216, represents a module in the memory 218 that manages the activation of the subscriber unit 122. To accomplish such, a user might contact the service provider by telephone, internet or the like and provide the service provider with necessary activation information such as billing information as well as the unique subscriber unit identification 242 which could come from a serial number on the back of the subscriber unit 122 or could be displayed from the memory 218 on the user interface 219 as by appropriate manipulation of the user controls 220. With this information, the operator would then be in a position to provide the necessary personal address information required to program it into the subscriber unit 122. A deactivator 255 preferably implements a similar process to disable or deactivate the generic activation process for the subscriber unit 122 at the discretion of the service provider.

Figure 3:
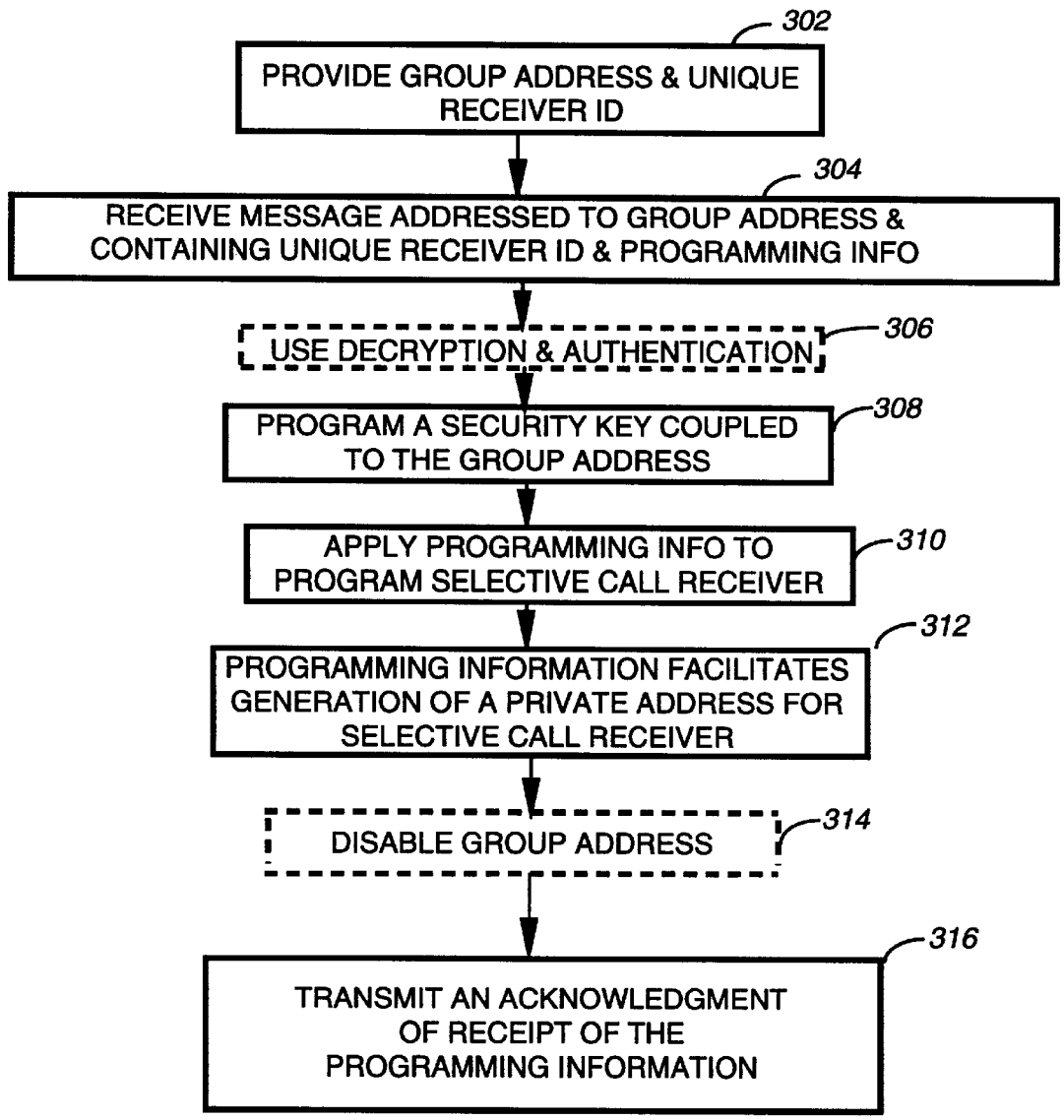
FIG. 3 is a flow chart depicting operation of the subscriber unit in accordance with one aspect of the instant invention.

The programming of such a private address 239 is illustrated in FIG. 3. As illustrated in this flow chart, a group address 251 and a unique selective call receiver ID 242 are provided in block 302. This information is then received as a part of the group address message 275 transmitted by the system infrastructure 102 along with the unique selective call receiver ID 242 and programming information 249 for setting up a private address 239 as illustrated in block 304. The method then optionally implements conventional decryption 259 and authentication 277 methodologies to the received message in step 306 to comply with the security specifications of the activation process. In step 308, the microprocessor 216 preferably programs a security/encryption key 293 coupled to the group address 251 or associated with the receiver ID 242 to prevent future unauthorized access to the selective call receiver 122 via the group address 251. Step 310 of the method applies the programming information 249 to the selective call receiver 122 for an initial activation and subsequent modification of general messaging or information services messaging. The result is seen in step 312, where the programming information 249 preferably facilitates generation of a private address 239 for the selective call receiver 122. This generic activation or modification of the selective call receiver 122 preferably removes the need for tracking and implementing of service provider, geographic, or user preference specific factors throughout the manufacturing and distribution processes. If desired in step 314, after programming the individual address 271, the group address 251 or ID can be optionally disabled as a part of the programming operation. The advantage to disabling the group address 251 is that the subscriber unit 122 need no longer decode messages addressed to that group address 251. This results in substantive battery savings. Alternatively, an decryption 259 and/or authentication 277 operation can be added to the group address 251. Such an approach is particularly useful where multiple service providers are utilizing the group address 251 for purposes of the programming the private address 239 of a pager 122. In this situation, when the selected service provider transmits the private address 239 information, the service provider would also provide the appropriate encryption 293 and authentication 277 keys so that subsequent messages to that group address 251 could only be generated by the selected service provider. The method concludes in step 316 when the selective call receiver 122 transmits an acknowledgment of receipt of the programming information 249 to the system infrastructure, or the user utilizes conventional means to notify the service provider of successful activation.

In another aspect of the invention, information relative to a group address 251 can also be programmed as a result of a message received at a group address 251. This is particularly valuable in the case of potentially available information services 288 that a subscriber may wish to add using an activator 257 or delete options using a deactivator 255 under the information services 288. For example, a new service may optionally provide sports, weather, stock market, international news, local news and the like. Such services may be at varying rates and can be customized to a user. Under known systems, the reconfiguration of such information service group addresses 253, if over the air must be accomplished via commands sent to the individual address 271 of a pager 122. In the present invention, a subscriber need merely provide the information service provider with his unique subscriber unit ID 242. Any particular services to be enabled or disabled for that information service group address 253 can be accomplished by transmission of a group address message 275 containing the unique subscriber unit ID 242 as well as the appropriate programming information commands 249. The programming information commands 249 can comprise a service provider indicator 265 reflecting varying levels of fee-based services, and if desired, messaging system encryption coupled with selective call receiver decryption 259 and authentication 277 can also be provided.

In another form of the instant invention, the activation, deactivation, or re-programming of customized information services independent of a paging service provider is discussed. Prior to initial activation, the selective call receiver 122 preferably has a first subscriber services address 243 and a unique subscriber identification 242 loaded into the memory 218. The first subscriber services address 243 corresponds to an address that identifies an information service provider or a group of bundled information services. The infrastructure of customized information services provider generates a first message 298 addressed to a first subscriber services address 243. The first message 298 includes the first subscriber services address 243 and an indicator 297. The indicator 297 corresponds to a predetermined unique subscriber identification for a particular selective call receiver 122 requiring activation, deactivation, or modification of customized information services. Upon receipt of the first message 298 addressed to the first subscriber services address 243, the microprocessor 216 of the selective call receiver 122 de-compiles the first message 298. The indicator 297 embedded in the first message 298 is extracted by the microprocessor 216, and the extracted indicator 297 is temporarily stored in message processing 211. The microprocessor 216 compares the unique subscriber ID 242 and the indicator 297. Contingent upon the results of this comparison, the microprocessor 216 accepts the first message 298 for programming the selective call receiver 122. The result is the generic activation, deactivation, or modification of the current portfolio of information services features afforded to a particular selective call receiver 122 by the customized information services provider independent of the paging service provider.

Figure 4:
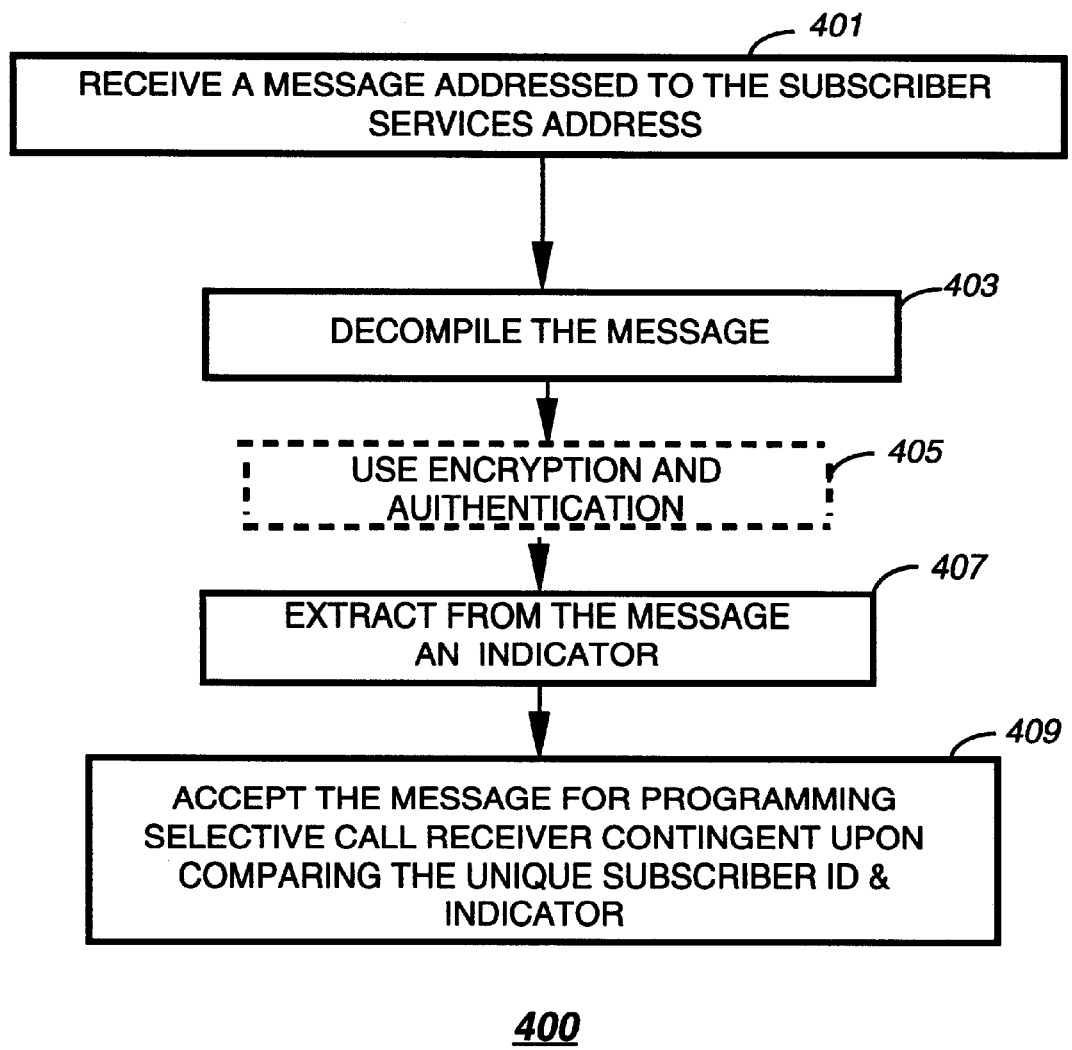
FIG. 4 is a second flow chart depicting operation of the subscriber unit in accordance with another aspect of the instant invention.

In another aspect of the instant invention, the re-programming of the existing information services is preferably accomplished by the method illustrated in the FIG. 4 depiction. The selective call receiver 122 receives a message addressed to the information services group address 253 in step 401. This message is de-compiled in step 403 by the controller 210 prior to optionally implementing decryption 259 and authentication 277 to the message in step 405. Step 407 extracts an indicator 265 from the message an indicator 265 reflective of how the service provider wishes to implement appropriate filtering of the information services message 288 based on the suite of services to be provided. In step 409 the method accepts the information services message 275 for programming the selective call receiver 122 contingent upon comparing the unique subscriber ID 242 and the indicator 265. This allows the microprocessor 216 coupled to the activator 257 to preferably modify the information services provided to the selective call receiver 122.

Thus, it should be clear from the preceding disclosure that the present invention provides a method and apparatus for generic selective call receiver activation as well as modification of existing information services profiles. The method and apparatus advantageously allows service providers the opportunity to forgo expensive inventory backlogs by affording activation options without the collocation of the selective call receiver and the activation means. Furthermore, the control of fee based information services can be facilitated without the aforementioned collocation.

Many modifications and variations of the present invention are possible in light of the above teachings. Thus, it is to be understood that, within the scope of the appended claims, the invention can be practiced other than as described herein above.

What is claimed is:

1. A method of programming a selective call receiver comprising the steps of:

providing a generic selective call receiver having a group address and a unique receiver identification, and having no private address programmed therein;

receiving at the selective call receiver a message addressed to said group address containing said unique receiver identification and Programming information; and upon receiving the group address and unique receiver identification, applying the programming information to program the selective call receiver with at last one of a private address and a portfolio of information services features.

2. The method of programming a selective call receiver as defined in claim 1 wherein said step of receiving further includes using decryption and authentication.

3. The method of programming a selective call receiver as defined in claim 1 wherein said step of applying the programming information comprises disabling the group address.

4. The method of programming a selective call receiver as defined in claim 1 wherein said step of applying the programming information includes programming a security key associated with the group address.

5. The method of programming a selective call receiver as defined in claim 1 further including a step of transmitting an acknowledgment of receipt of the programming information.

6. The method of programming a selective call receiver as defined in claim 1, further comprising the steps of:

conveying the unique receiver identification to a user; and reporting by the user the unique receiver identification to a service provider to enable activation of the selective call receiver through said group address.

7. The method of programming a selective call receiver as defined in claim 1 further including a step of programming a new group address.

8. The method of programming a selective call receiver as defined in claim 1 further including a step of changing a functionality associated with an existing group address.

9. A generic selective call receiver having no private address programmed therein and capable of receiving a message containing a group address, a receiver ID and programming instructions, comprising:

a receiver portion for receiving said message;

a controller coupled to the receiver portion for processing said message;

a memory coupled to said controller, the memory containing at least a group address and a receiver ID;

the controller including an address comparator for comparing the received group address with the group address from the memory, and further including an ID comparator for comparing the received ID with the ID from the memory; and a programmer responsive to the address and ID comparators for programming said memory with at least one of a private address and a portfolio of information services features based upon the received programming information.

10. The selective call receiver of claim 8 further including a transmitter coupled to the controller for transmitting a response message for acknowledging receipt of the message containing the group address, the receiver ID and the programming instructions.

11. The selective call receiver of claim 9 wherein the memory further includes a shared encryption key associated with the receiver ID for decrypting the message.

12. The selective call receiver of claim 9 further including a user interface for facilitating the application of the programming information.

13. The selective call receiver of claim 9 wherein the memory further includes a private address area for storage of the private address defined by the programming information.

14. A method of providing a selective call radio communication unit with a private address, comprising the steps of:

providing a generic selective call radio communication unit having a group address and a unique receiver ID, and having no private address programed therein;

receiving a transmission at the selective call radio communication unit including the group address, the unique receiver ID and information for programming a private address; and programming the selective call radio communication unit with the private address based upon the received information.

* * * * *